(12) United States Patent
Hattenbach et al.

(10) Patent No.: US 7,691,028 B2
(45) Date of Patent: Apr. 6, 2010

(54) MECHANICAL SOFT-START SYSTEM FOR ROTATING INDUSTRIAL EQUIPMENT

(75) Inventors: Timothy J. Hattenbach, Houston, TX (US); Morgan L. Hendry, Wilmington, DE (US)

(73) Assignee: ConocoPhillips Company, Houston, TX (US)

( * ) Notice: Subject to any disclaimer, the term of this patent is extended or adjusted under 35 U.S.C. 154(b) by 386 days.

(21) Appl. No.: 11/381,173

(22) Filed: May 2, 2006

(65) Prior Publication Data

US 2008/0081733 A1 Apr. 3, 2008

(51) Int. Cl.
*F16H 61/48* (2006.01)
*B60W 10/04* (2006.01)
*F16H 47/08* (2006.01)
*F16H 47/00* (2006.01)

(52) U.S. Cl. ............................ 477/55; 477/107; 475/52; 74/718

(58) Field of Classification Search ................... 74/718, 74/720, 730.1, 731.1, 732.1, 733.1, 329, 74/339; 477/53, 54, 55, 65, 67, 107; 475/47, 475/51, 52, 53, 303
See application file for complete search history.

(56) References Cited

U.S. PATENT DOCUMENTS

| | | | |
|---|---|---|---|
| 2,611,247 A | | 9/1952 | Brown |
| 2,884,809 A | | 5/1959 | Moore |
| 2,924,990 A | | 2/1960 | Orr et al. |
| 4,016,779 A | | 4/1977 | Von Greyerz |
| 4,548,101 A | * | 10/1985 | Akashi et al. .................. 74/720 |
| 4,641,549 A | * | 2/1987 | Muller .......................... 477/62 |
| 4,961,721 A | * | 10/1990 | Sword et al. ................... 475/47 |
| 5,030,179 A | * | 7/1991 | Ganoung ....................... 475/50 |
| 5,099,711 A | * | 3/1992 | Langbo et al. ............. 74/336 R |
| 5,186,291 A | * | 2/1993 | Hedstrom et al. .......... 192/3.23 |
| 6,463,740 B1 | * | 10/2002 | Schmidt et al. |
| 6,640,586 B1 | * | 11/2003 | Baudat et al. |
| 6,691,531 B1 | * | 2/2004 | Martinez et al. |
| 2002/0035010 A1 | * | 3/2002 | Kobayashi .................... 477/54 |

FOREIGN PATENT DOCUMENTS

| | | | |
|---|---|---|---|
| EP | 0734113 B1 | * | 8/2002 |
| WO | WO 97/33131 | * | 9/1997 |
| WO | WO2005047789 | * | 5/2005 |

OTHER PUBLICATIONS

The American Society of Mechanical Engineers; B. Michael Zekas and Andrew N. Schultz; Unique Referse and Maneuvering Features of the AOE-6 Reverse Reduction Gear; pp. 1-8; 1997 Philadelphia, Pennsylvania.*
The American Society of Mechanical Engineers; H.A. Clements; Stopping and Reversing High Power Ships; pp. 1-11; 1989 England.*
The American Society of Mechanical Engineers; H.A. Clements and E. Fortunato; An Advance in Reversing Transmissions for Ship Propulsion; pp. 1-13; 1979 England.*

* cited by examiner

*Primary Examiner*—Roger Pang

(57) ABSTRACT

A system that employs a torque converter and a shiftable mechanical lock to start up rotating industrial equipment. A gear mechanism is employed to account for rotational slippage inherent in the torque converter. The torque converter and gear mechanism are used during start-up to increase the speed of the rotating industrial equipment. When the speed of the rotating industrial equipment is substantially synchronized with the speed of the driver, the mechanical lock is engaged.

12 Claims, 7 Drawing Sheets

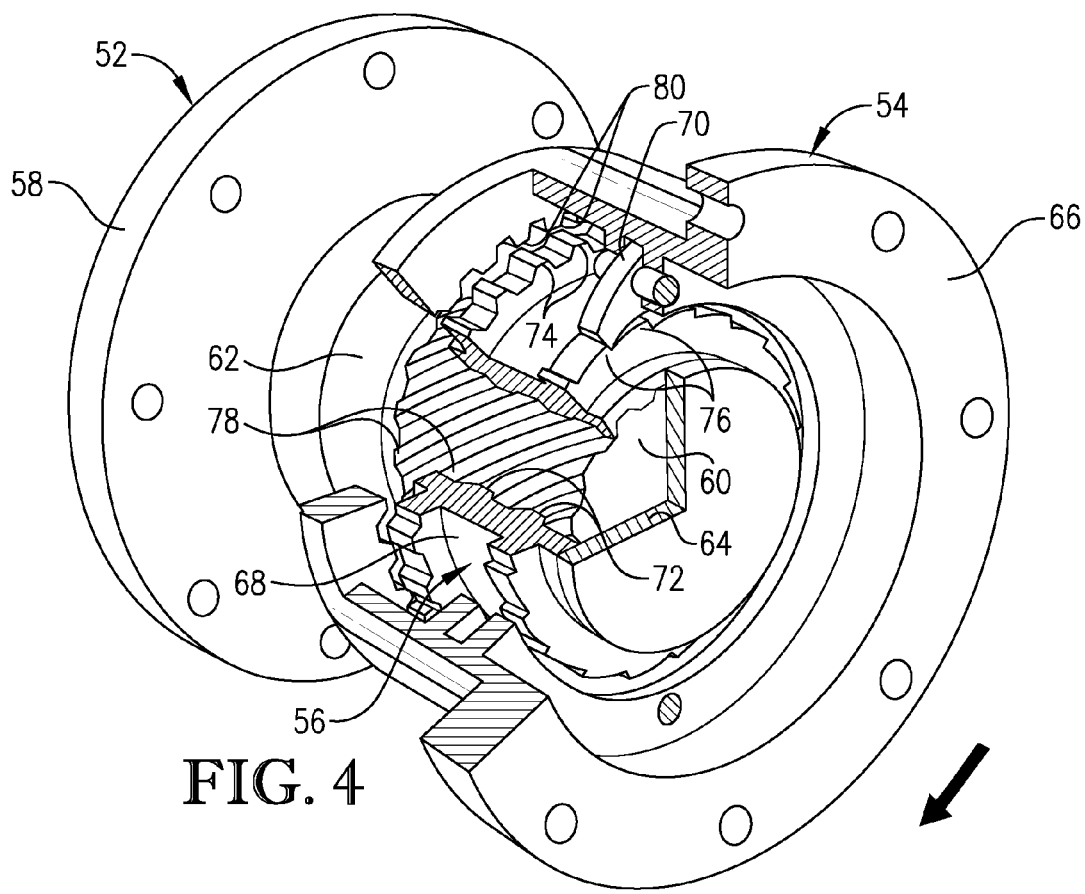
FIG. 4
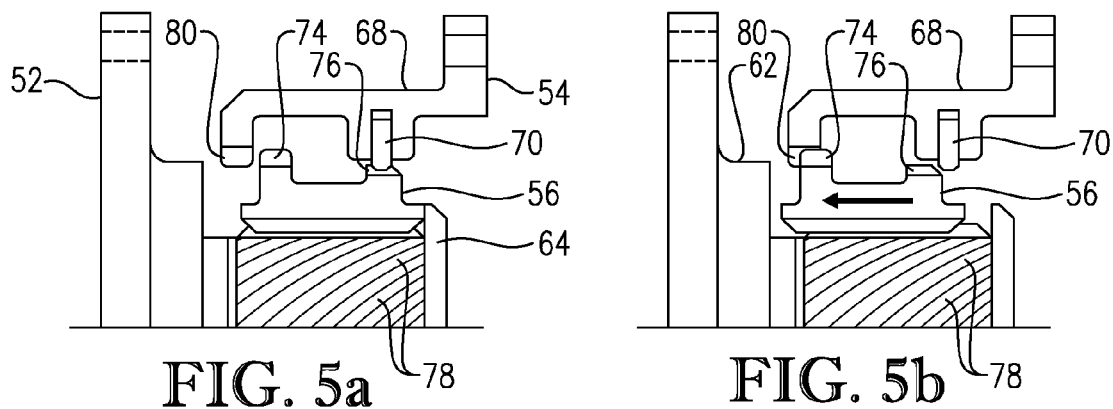
FIG. 5a
FIG. 5b
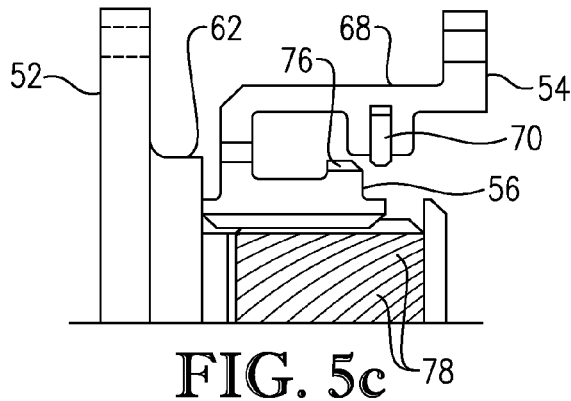
FIG. 5c

START-UP
T.C. - ENGAGED
M.L. - DISENGAGED

NORMAL
T.C. - DISENGAGED
M.L. - ENGAGED

START-UP
T.C. - ENGAGED
M.L. - DISENGAGED

NORMAL
T.C. - DISENGAGED
M.L. - ENGAGED

START-UP
T.C. - ENGAGED
M.L. - DISENGAGED

NORMAL
T.C. - DISENGAGED
M.L. - ENGAGED

MECHANICAL SOFT-START SYSTEM FOR ROTATING INDUSTRIAL EQUIPMENT

BACKGROUND OF THE INVENTION

1. Field of the Invention

The present invention relates generally to systems from transmitting torque from a rotating driver to one or more items of rotating industrial equipment. In another aspect, the invention concerns a method and apparatus for starting up a large compressor driven by a gas turbine.

2. Description of the Prior Art

Rotating drivers powering rotating equipment are employed in many industrial applications. For example, facilities that produce electrical power frequently employ a gas turbine to power an electrical generator. Further, liquified natural gas (LNG) facilities typically employ at least one gas turbine or electrical motor to power a refrigerant compressor.

When large inertia and operating loads are imposed by rotating industrial equipment on rotating drivers, it may be impossible for the driver to reach operating speed while it is coupled to the rotating equipment. In the past, additional "starter" motors have frequently been employed to assist the start-up of large rotating industrial equipment. The starter motors are typically used to help bring the rotating equipment up to operating speed. However, starter motors that are powerful enough to increase the rotational speed of large rotating industrial equipment from zero to full operating speed require complex variable frequency electrical supply and control systems that are very expensive.

OBJECTS AND SUMMARY OF THE INVENTION

It is, therefore, an object of the present invention to provide an improved system for starting up rotating industrial equipment having large inertia and operating loads without requiring the use of a large starter motor that is capable of accelerating the equipment from static conditions to full operating speed.

Accordingly, one aspect of the present invention concerns a method of starting up rotating industrial equipment comprising the following steps: (a) using a torque converter to transmit torque from a rotational driver to the rotating industrial equipment; (b) using at least one gear mechanism to substantially synchronize the speeds of a first drive-side element and a first load-side element, the first drive-side and load-side elements having a shiftable mechanical lock coupled therebetween; and (c) using the mechanical lock to transmit torque from the driver to the rotating industrial equipment.

Another aspect of the invention concerns a method of starting up rotating industrial equipment comprising the following steps: (a) using a rotational driver to simultaneously rotate a first drive-side element, a first load-side element, a second drive-side element, and a second load-side element. The first drive-side and load-side elements have a mechanical lock coupled therebetween, while the second drive-side and load-side elements have a torque converter coupled therebetween.

Still another aspect of the invention concerns a method of starting up rotating industrial equipment comprising the following steps: (a) using a rotating driver to rotate a first drive-side element, a second drive-side element, a first load-side element, and a second load-side element while the first drive-side element and the first load-side element are not mechanically coupled to one another; and (b) using a mechanical lock to mechanically couple the first drive-side element and the first load-side element to one another. Step (a) includes employing a drive-side gear mechanism and/or a load-side gear mechanism. The drive-side gear mechanism, if employed, is configured to cause the first and second drive-side elements to rotate at different speeds. The load-side gear mechanism, if employed, is configured to cause the first and second load-side elements to rotate at different speeds.

Yet another aspect of the invention concerns an apparatus for transferring torque from a rotating driver to rotating industrial equipment. The apparatus comprises first and second drive-side elements, first and second load-side elements, a shiftable mechanical lock, and a torque converter. The first and second load-side elements are rotatably coupled to the rotating industrial equipment, while the first and second drive-side elements are rotatably coupled to the driver. The mechanical lock is operably coupled between the first drive-side and load-side elements. The torque converter is operably coupled between the second drive-side and load-side elements.

BRIEF DESCRIPTION OF THE DRAWING FIGURES

A preferred embodiment of the present invention is described in detail below with reference to the attached drawing figures, wherein:

FIG. 4 is a partially cut-away isometric view of a synchro-self-shifting (SSS) clutch that can be employed as the shiftable mechanical lock in the system illustrated in FIGS. 1 and 2;

FIG. 5a is a partial sectional side view illustrating the SSS clutch of FIG. 4 in a disengaged configuration;

FIG. 5b is a partial sectional side view illustrating the SSS clutch of FIG. 4 in a transition configuration;

FIG. 5c is a partial sectional side view illustrating the SSS clutch of FIG. 4 in an engaged configuration;

Figure 6:
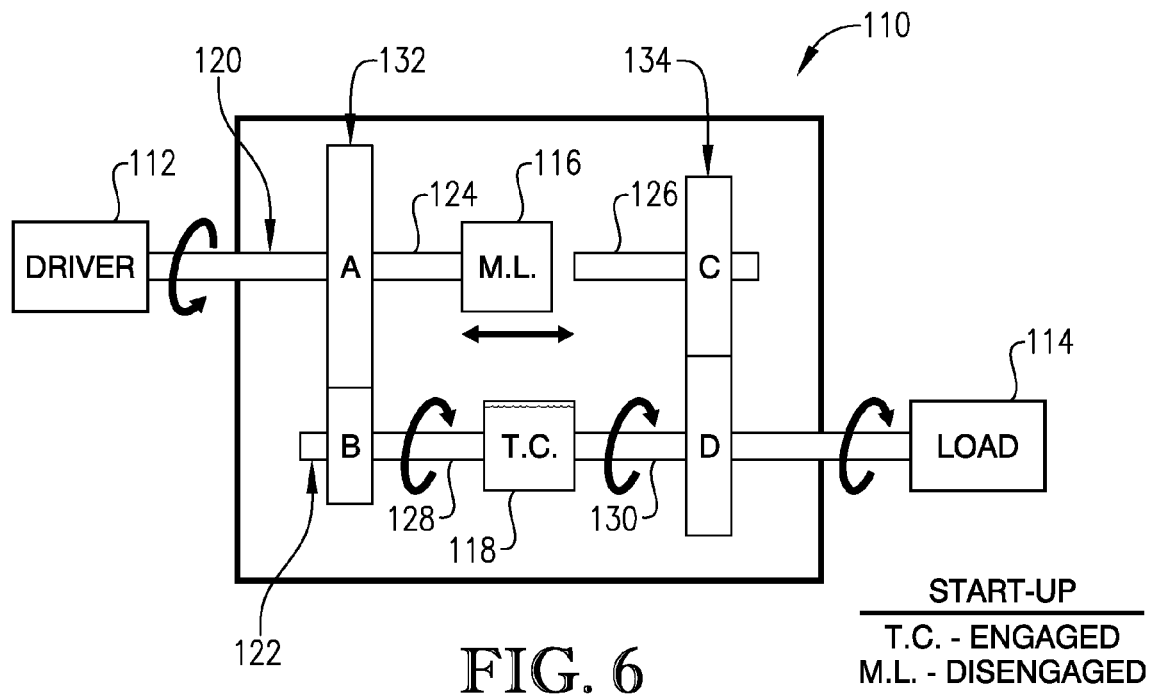
Figure 7:
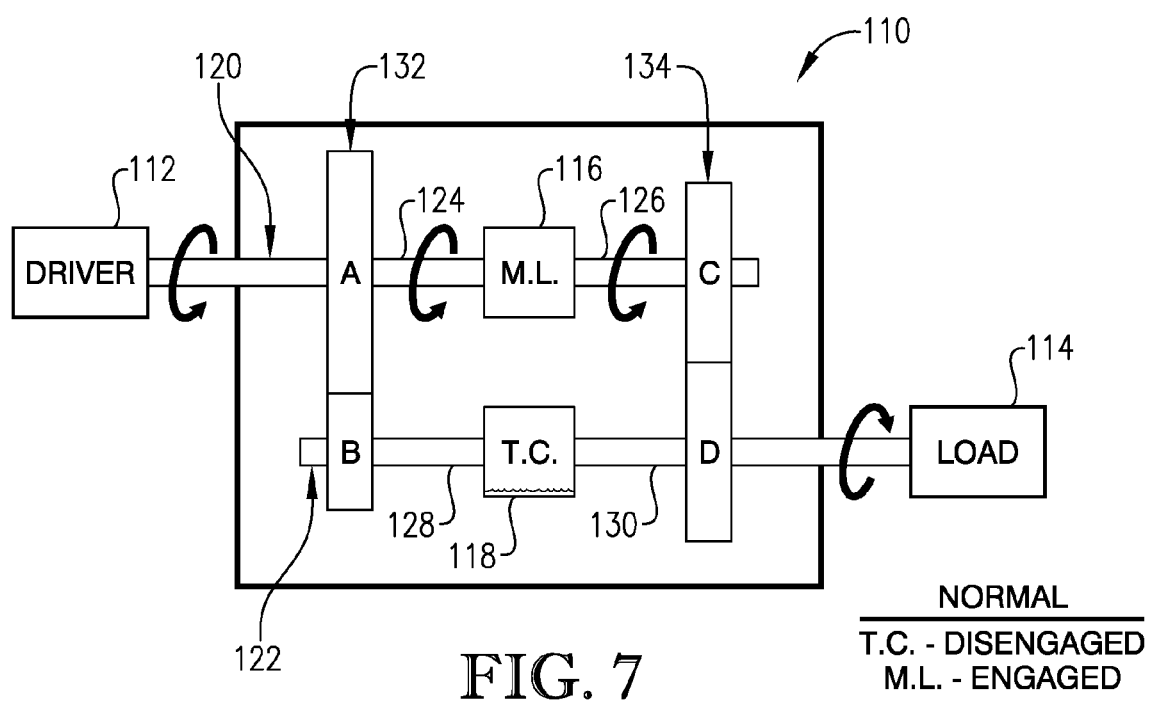
Figure 8:
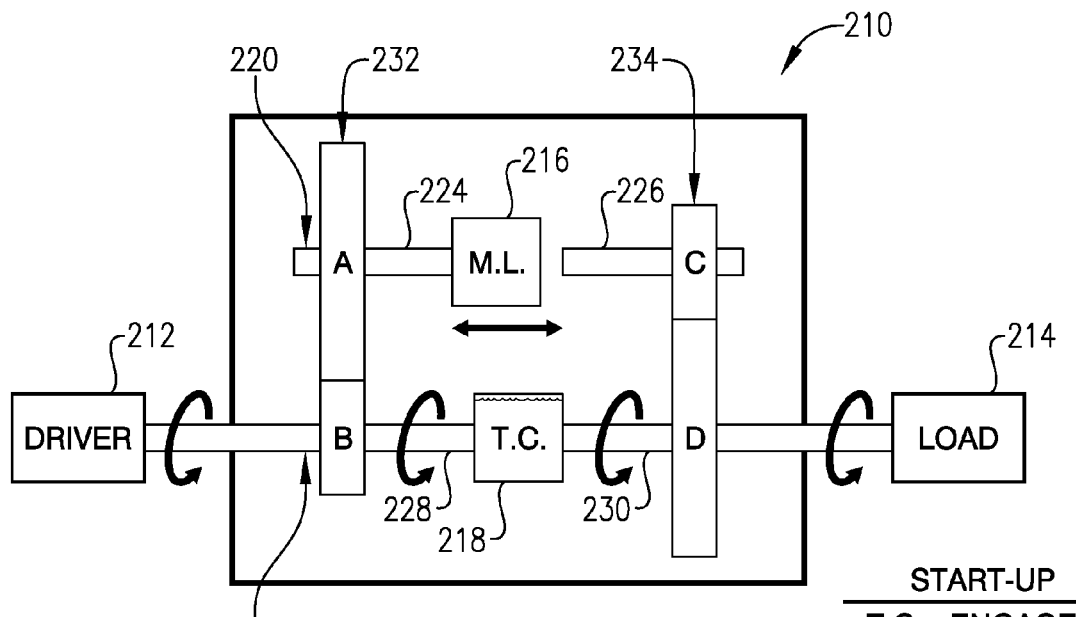
Figure 9:
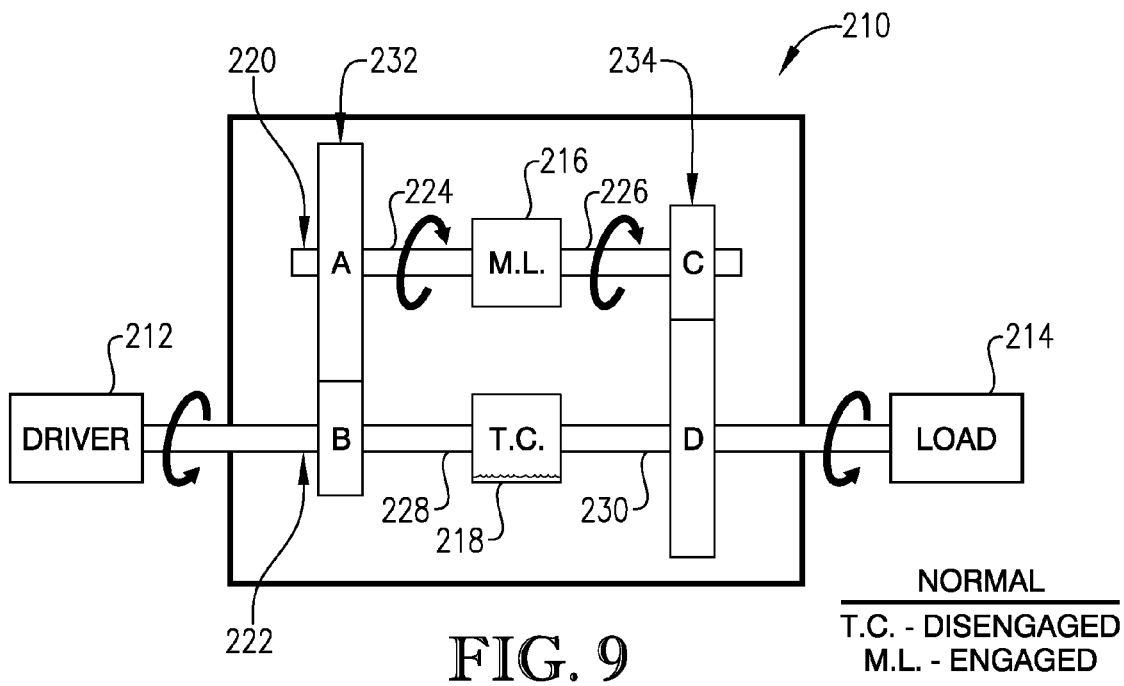
Figure 10:
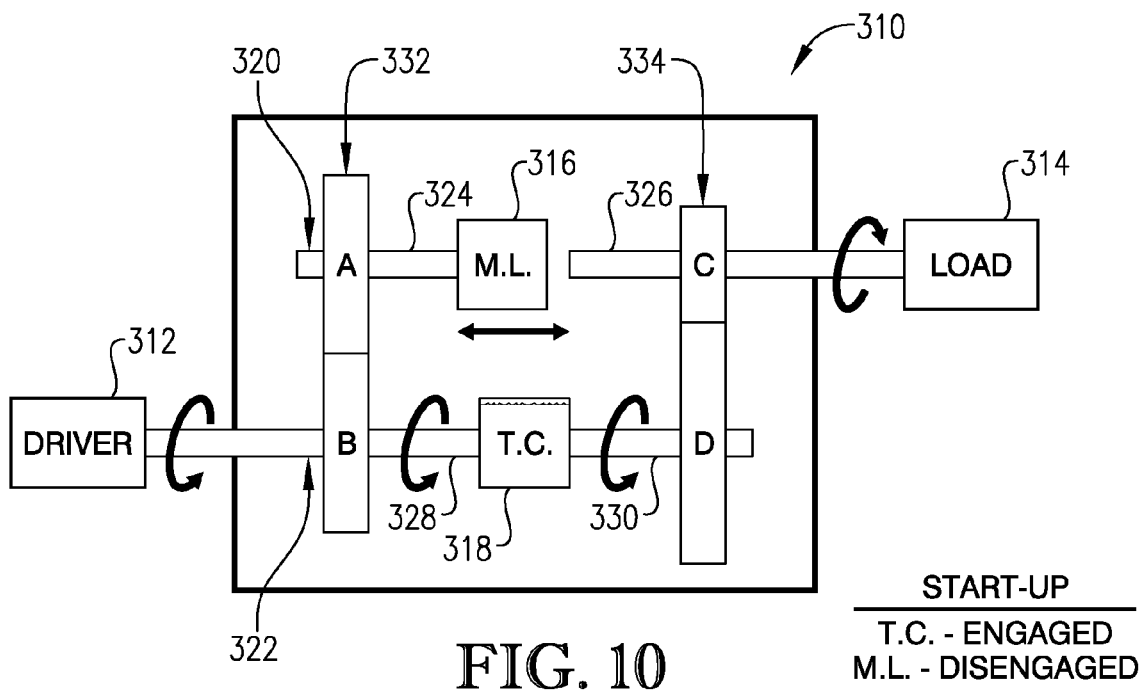
Figure 11:
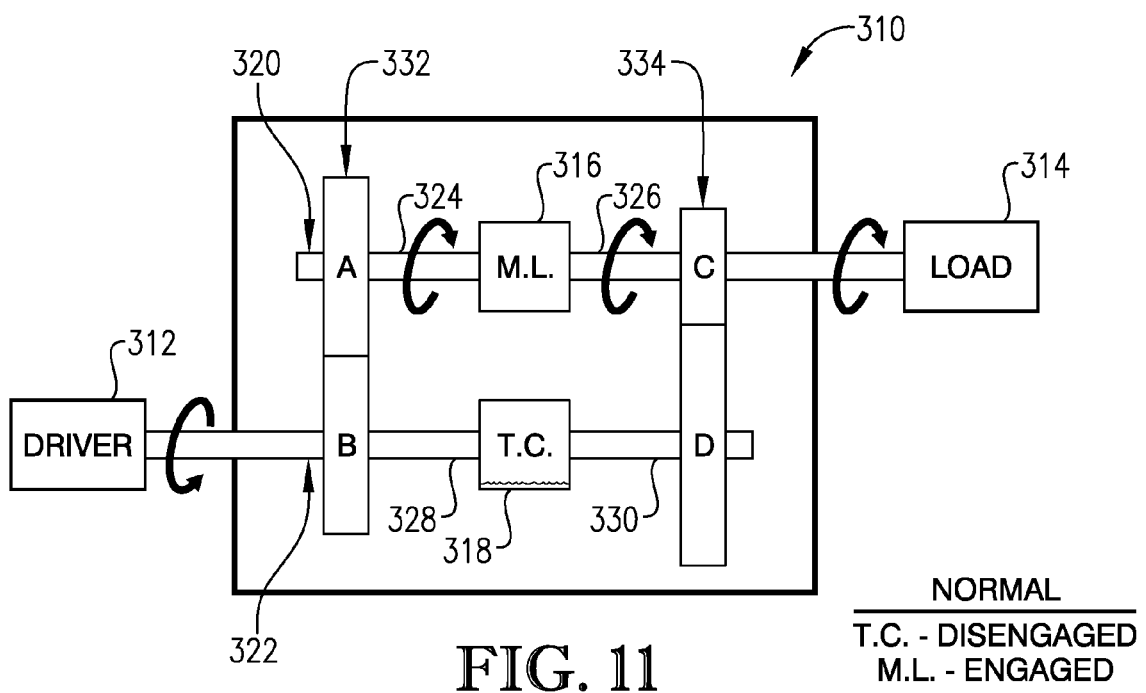

FIG. 6 is a schematic representation of an alternative torque transmitting system where the driver is directly coupled to the mechanical lock input shaft and the rotating industrial equipment is directly coupled to the torque converter output shaft, particularly illustrating the system in a start-up configuration where the mechanical lock is disengaged and the torque converter is engaged so that torque is transmitted from the driver to the rotating industrial equipment via the torque converter;

FIG. 7 is a schematic representation of the alternative torque transmitting system of FIG. 6 in a normal configuration where the torque converter is disengaged and the mechanical lock is engaged so that torque is transmitted from the driver to the rotating industrial equipment via the mechanical lock;

FIG. 8 is a schematic representation of an alternative torque transmitting system where the driver is directly coupled to the torque converter input shaft and the rotating industrial equipment is directly coupled to the torque converter output shaft, particularly illustrating the system in a start-up configuration where the mechanical lock is disengaged and the torque converter is engaged so that torque is transmitted from the driver to the rotating industrial equipment via the torque converter;

FIG. 9 is a schematic representation of the alternative torque transmitting system of FIG. 8 in a normal configuration where the torque converter is disengaged and the mechanical lock is engaged so that torque is transmitted from the driver to the rotating industrial equipment via the mechanical lock;

FIG. 10 is a schematic representation of an alternative torque transmitting system where the driver is directly coupled to the torque converter input shaft and the rotating industrial equipment is directly coupled to the mechanical lock output shaft, particularly illustrating the system in a start-up configuration where the mechanical lock is disengaged and the torque converter is engaged so that torque is transmitted from the driver to the rotating industrial equipment via the torque converter; and FIG. 11 is a schematic representation of the alternative torque transmitting system of FIG. 10 in a normal configuration where the torque converter is disengaged and the mechanical lock is engaged so that torque is transmitted from the driver to the rotating industrial equipment via the mechanical lock.

Figure 12:
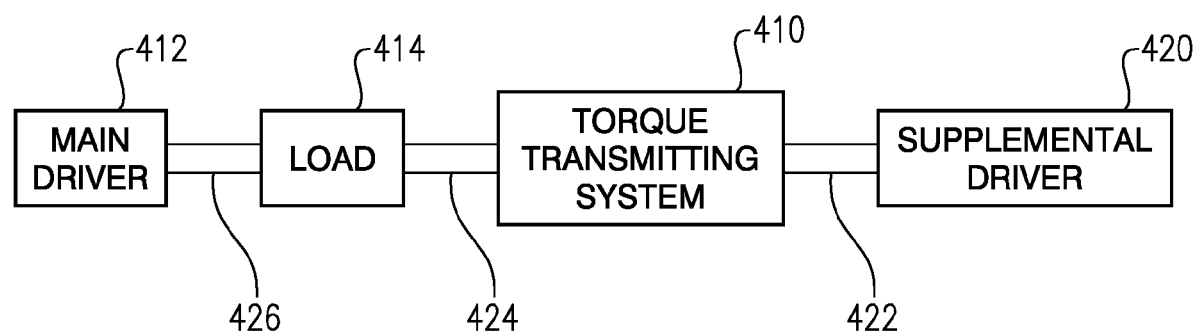

FIG. 12 is a schematic representation of a system that employs a main driver and supplemental driver to rotate industrial equipment, illustrating that a torque transmitting system similar to the torque transmitting systems illustrated in FIGS. 1-11 (i.e., including a torque converter and a mechanical lock) is employed to transmit torque from the supplemental driver to the rotating industrial equipment.

DETAILED DESCRIPTION OF THE PREFERRED EMBODIMENT

Figure 1:
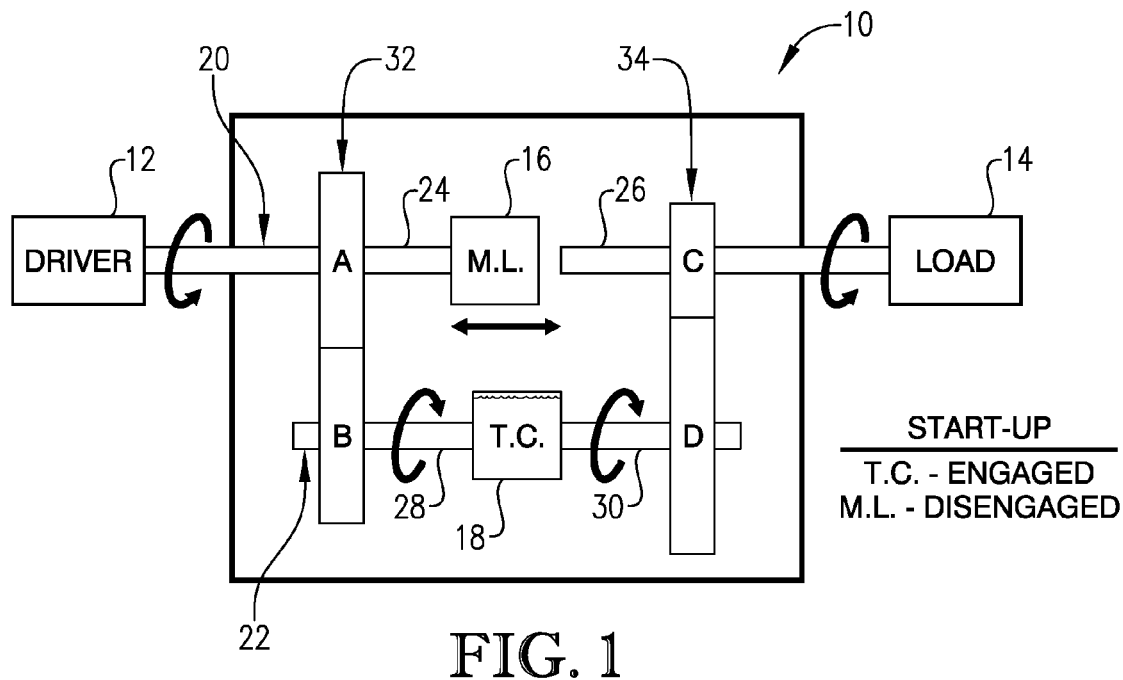
FIG. 1 is a schematic representation of a system employing a torque converter and a shiftable mechanical lock on separate parallel shafts, particularly illustrating the system in a start-up configuration where the mechanical lock is disengaged and the torque converter is engaged so that torque is transmitted from the driver to the rotating industrial equipment via the torque converter.
Figure 2:
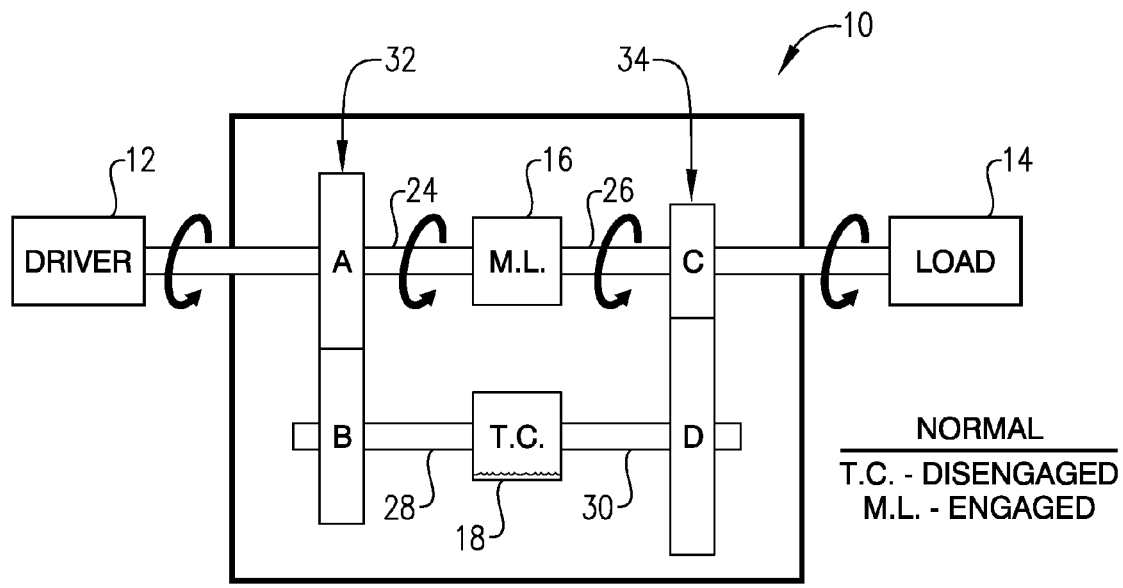
FIG. 2 is a schematic representation of the torque transmitting system of FIG. 1 in a normal configuration where the torque converter is disengaged and the mechanical lock is engaged so that torque is transmitted from the driver to the rotating industrial equipment via the mechanical lock.

FIGS. 1 and 2 illustrate a torque transmitting system 10 for transmitting torque from a rotational driver 12 to one or more items of rotating industrial equipment 14. FIG. 1 depicts system 10 during start-up, while FIG. 2 depicts system 10 during normal operation. Torque transmitting system 10 comprises a shiftable mechanical lock 16 ("M.L.") and an adjustable torque converter 18 ("T.C."). As depicted in FIG. 1, during start-up, torque converter 18 is employed to transmit torque from driver 12 to rotating industrial equipment 14, while mechanical lock 16 is disengaged. As depicted in FIG. 2, during normal operation, mechanical lock 16 is employed to transmit torque from driver 12 to rotating industrial equipment 14, while torque converter 18 is disengaged.

Mechanical lock 16 and torque converter 18 are located on first and second separate parallel shafts 20 and 22, respectively. Mechanical lock 16 is coupled between a first drive-side element 24 of first parallel shaft 20 and a first load-side element 26 of first parallel shaft 20. Torque converter 18 is coupled between a second drive-side element 28 of second parallel shaft 22 and a second load-side element 30 of second parallel shaft 22. Torque transmitting system 10 also includes a drive-side gear mechanism 32 and a load-side gear mechanism 34. Drive-side gear mechanism 32, which can include a first drive gear "A" and a second drive gear "B," is configured to transfer rotational energy between first drive-side element 24 and second drive-side element 28. Load-side gear mechanism 34, which can include a first load gear "C" and a second load gear "D," is configured to transfer rotational energy between first load-side element 26 and second load-side element 30.

Mechanical lock 16 can be any device capable of selectively mechanically coupling and decoupling first drive-side element 24 and first load-side element 26. Thus, it is preferred for mechanical lock 16 to be shiftable between an engaged/locked configuration where first drive-side and load-side elements 24 and 26 are mechanically coupled to one another and a disengaged/unlocked configuration where first drive-side and load-side elements 24 and 26 are not mechanically coupled to one another.

Torque converter 18 can be any device capable of adjusting the amount of torque transmitted from second drive-side element 28 to second load-side element 30. Preferably, torque converter 18 is adjustable between a free-wheel/disengaged configuration where little or no torque is transmitted from second drive element 28 to second load element 30 via torque converter 18 and a torque-transmitting/engaged configuration where a substantial amount of torque is transmitted from second drive element 28 to second load element 30 via torque converter 18. As used herein, the term "torque converter" denotes a device that transmits torque from a rotating drive element to a rotatable load element, but exhibits some rotational slippage during torque transmission. The rotational slippage associated with a torque converter does not permit the rotational speed of the load element to be exactly synchronized with the rotational speed of the drive element when (1) the load element is driven only by the drive element, (2) the drive element rotates at a substantially constant speed, and (3) the load and drive elements are not mechanically locked to one another.

Rotational driver 12 can be any device(s) capable of producing rotational mechanical energy. For example, rotational driver 12 can be an electric motor, a steam turbine, an expander turbine, a hydraulic turbine, or a gas turbine. Preferably, rotational driver 12 is a gas turbine. The present invention is particularly well suited for applications where rotational driver 12 is capable of producing very large amounts of power but relatively low torque until it reaches rotational speed. Preferably, rotational driver 12 is capable of providing at least about 2,000 horsepower, more preferably at least about 10,000 horsepower, and most preferably in the range of from 20,000 to 200,000 horsepower. Preferably, rotational driver 12 operates at a rotational speed of at least about 1,000 revolutions per minute (rpm), more preferably at least about 2,000 rpm, and most preferably in the range of from 2,500 to 8,000 rpm.

Rotating industrial equipment 14 can be any industrial device(s) requiring a power input in the form of rotational mechanical energy. For example, rotating industrial equipment 14 can be an electric generator, a pump, a grinder, a ball mill, an extruder, a reciprocating compressor, an axial compressor, or a centrifugal compressor. Preferably, rotating industrial equipment 14 is an electric generator or a centrifugal compressor. Most preferably, rotating industrial equipment 14 is a centrifugal compressor. In one embodiment, the amount of power and the rotational speed required to drive rotating industrial equipment 14 is the same as set forth above with reference to the power and speed output of rotational driver 12.

Referring again to FIGS. 1 and 2, in operation, torque transmitting system 10 can be employed to help start up driver 12 and rotating industrial equipment 14 without requiring the use of additional external drivers for increasing the rotational speed of rotating industrial equipment 14. Further, system 10 can be used during normal operation to transmit torque from driver 12 to rotating industrial equipment 14 via mechanical lock 16. Torque transmitting system 10 can be operated in four different modes to help transition driver 12 and rotating industrial equipment 14 from static conditions to full operating conditions. The four modes of operation of system 10 can be identified as follows: (1) a "driver-only mode;" (2) a "torque transition mode;" (3) a "synchronized mode;" and (4) a "mechanically-locked mode."

In the "driver-only mode," the rotational speed of driver 12 is increased from at or near zero revolutions per minute (rpm) to full operating speed, while the rotational speed of rotating industrial equipment 14 is maintained at or near zero. During the driver-only mode, driver 12 rotates only the drive-side portion (including first drive-side element 24) of first parallel shaft 20. Drive-side gear mechanism 32 transmits rotational energy from the drive-side portion of first parallel shaft 20 to the drive-side portion (including second drive-side element 28) of second parallel shaft 22. During the driver-only mode, torque converter 18 is in the free-wheel/disengaged configuration so that little or no torque is transmitted from second drive-side element 28 to second load-side element 30. Thus, the load-side portions of first and second parallel shafts 20 and 22 (including first and second load-side elements 26 and 30) do not rotate during the driver-only mode. Nor, does rotating industrial equipment 14 rotate during the driver-only mode.

During the driver-only mode, the rotational speed of first drive-side element 24 is increased from at or near zero to an operational first drive element speed. Preferably, the operational first drive element speed is at least about 1,000 rpm, more preferably at least about 2,000 rpm, and most preferably in the range of from 2,500 to 8,000 rpm. After rotational driver 12 reaches its full operating speed, torque transmitting system 10 can be shifted from the driver-only mode to the torque transition mode. In order to shift from the driver-only mode to the torque transition mode, torque converter 18 is adjusted from the free-wheel/disengaged configuration to the torque-transmitting/engaged configuration.

In the "torque transition mode," which is depicted in FIG. 1, the rotational speed of driver 12, first drive-side element 24, and second drive-side element 28 are maintained at approximately full operating speed and torque converter 18 is employed to transmit torque from second drive-side element 28 to second load-side element 30, thereby increasing the rotational speeds of first load-side element 26, second load-side element 30, and rotating industrial equipment 14 from at or near zero to rotational speeds approaching their full operating speeds. During the torque transition mode, the rotational speed of second load-side element 30 is increased from at or near zero to a maximum second load element speed. Due to rotational slippage inherent in torque converter 18, during the torque transition mode, the maximum rotational speed of second load-side element 30 is less than the maximum rotational speed of second drive-side element 28. Typically, the rotational speed of second load-side element 30 is at least about 5 rpm less than the rotational speed of second drive-side element 28 during the torque transition mode. More typically, the rotational speed of second load-side element 30 is at least 20 rpm less than the rotational speed of second drive-side element 28 during the torque transition mode. However, it is preferred for the rotational slippage associated with torque converter 18 during the torque transition mode to be minimized so that the rotational speed of second load-side element 30 is within about 20 percent of the rotational speed of second drive-side element 28, more preferably the rotational speed of second load-side element 30 is within 10 percent of the rotational speed of second drive-side element 28.

In order to account for the rotational slippage inherent in torque converter 18 during the torque transition mode, drive-side gear mechanism 32 and/or load-side gear mechanism 34 can have a gear ratio(s) that allows the rotational speeds of first drive-side element 24 and first load-side element 26 to be substantially synchronized when driver 12 is powering rotating industrial equipment 14 at full operational speed via torque converter 18. For example, FIG. 1 illustrates an embodiment where first and second drive gears "A" and "B" are substantially the same size, but first load gear "C" is smaller than second load gear "D." In this configuration, drive-side gear mechanism 32 causes first and second drive-side elements 24 and 28 to rotate at substantially the same speed, while load-side gear mechanism 34 causes first load-side element 26 to rotate faster than second load-side element 30. The relative speed increase from second load-side element 30 to first load-side element 26 caused by load-side gear mechanism 34 substantially matches the relative speed decrease between second drive-side element 28 and second load-side element 30 caused by slippage in torque converter 18. Thus, load-side gear mechanism 34 allows the speeds of first drive-side and load-side elements 24 and 26 to be synchronized during the torque transition mode. It should also be noted that the gear ratio of drive-side gear mechanism 32 could alternatively or additionally be modified to fully or partially account for the rotational slippage in torque converter 18.

When the rotational speed of first load-side element 26 is substantially synchronized with the rotational speed of first drive-side element 24, it is preferred for the rotational speed of first load-side element 26 to be within about 5 percent of the rotational speed of first drive-side element 24, more preferably within about 2 percent of the rotational speed of first drive-side element 24, still more preferably within about 1 percent of the rotational speed of first drive-side element 24, and most preferably within 0.5 percent of the rotation speed of first drive-side element 24. When the rotational speed of first load-side element 26 is substantially synchronized with the rotational speed of first drive-side element 24, it is preferred for the rotational speed of first load-side element 26 to be within about 50 rpm of the rotational speed of first drive-side element 24, more preferably within about 20 rpm of the rotational speed of first drive-side element 24, still more preferably within about 5 rpm of the rotational speed of first drive-side element 24, and most preferably within 1 rpm of the rotational speed of first drive-side element 24. Once driver 12 and rotating industrial equipment 14 are operating at full speed and the rotational speeds of first drive-side and load-side elements 24 and 26 are substantially synchronized, mechanical lock 16 can be shifted from the unlocked/disengaged configuration to the locked/engaged configuration.

During the "synchronized mode," both mechanical lock 16 and torque converter 18 are in the engaged configuration. Preferably, system 10 operates in the synchronized mode for a very short period of time because once mechanical lock 16 has been engaged, there is no further need to use torque converter 18 to transmit torque. Thus, soon after mechanical lock 16 is shifted into the engaged configuration, torque converter 18 is adjusted back into the disengaged/free-wheel configuration, thereby transitioning system 10 into the mechanically-locked mode.

In the "mechanically-locked mode," depicted in FIG. 2, mechanical lock 16 is in the engaged configuration, while torque converter 18 is in the disengaged configuration so that all of the torque transmitted from driver 12 to rotating industrial equipment 14 is transmitted via mechanical lock 16.

In one embodiment of the invention, during the driver-only and torque transition modes, the power required to rotate industrial equipment 14 is reduced below the full design power requirement of rotating industrial equipment 14 by adjusting an operating parameter of rotating industrial equipment 14. During the mechanically-locked mode, the power required to rotate rotating industrial equipment 14 can then be increased to the full design requirement. For example, when rotating industrial equipment 14 is a compressor, the pressure differential provided by the compressor can be reduced during start-up and then increased to full design capacity after mechanically locking driver 12 and rotating industrial equipment 14 to one another. Typically, the power requirement of rotating industrial equipment 14 is increased at least about 5 percent after mechanically locking system 10, more typically at least about 15 percent, and most typically at least 25 percent. This varying of the amount of load aids in start-up of driver 12 and rotating industrial equipment 14. Further, adjustment of the amount of load allows torque converter 18 to be rated at less than full operating capacity.

Figure 3:
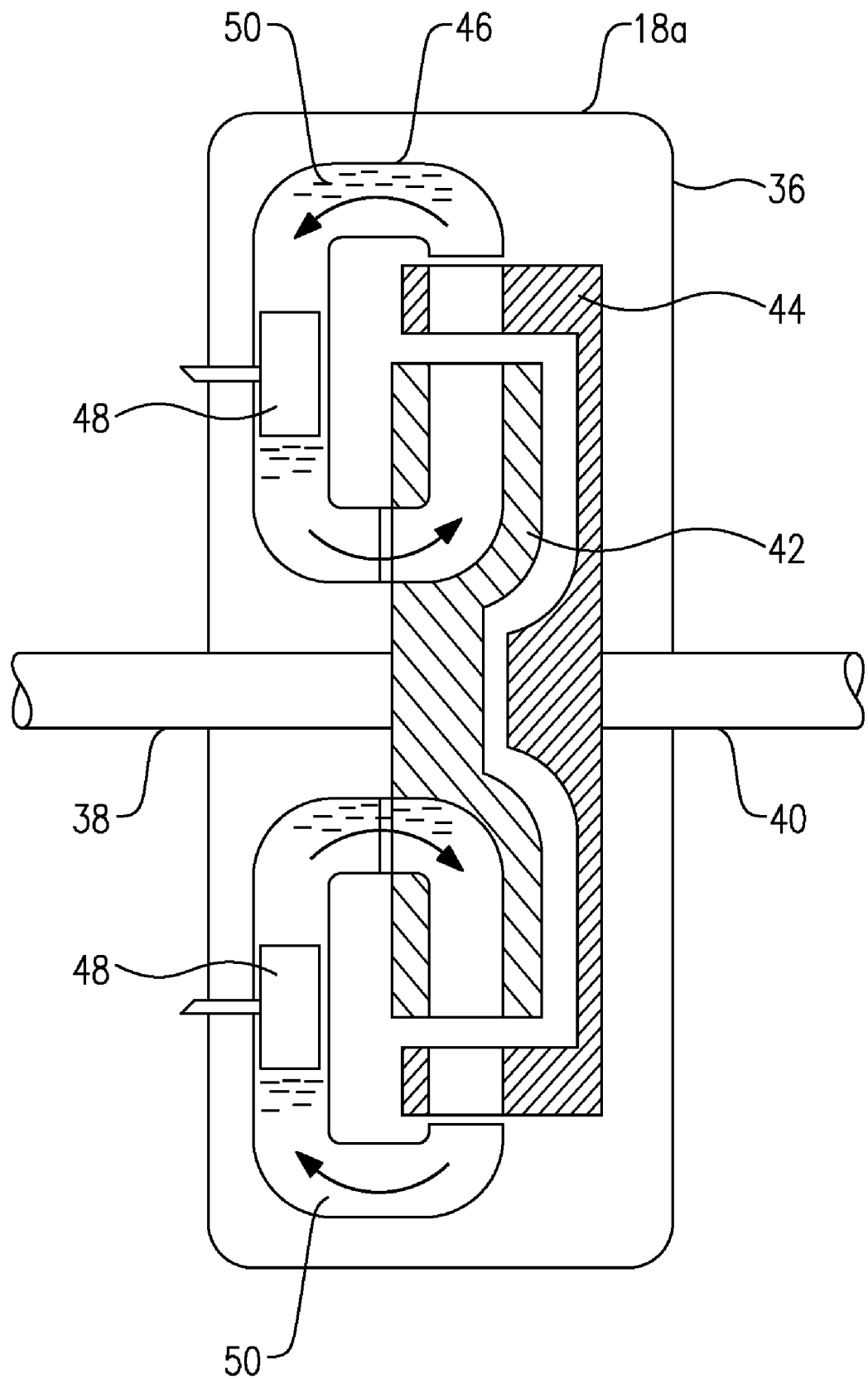
FIG. 3 is a sectional view of a fluid coupling that can be employed as the torque converter in the system illustrated in FIGS. 1 and 2.

Referring now to FIGS. 1-3, in one embodiment of the present invention, torque converter 18 of FIGS. 1 and 2 is a fluid coupling. As used herein, the term "fluid coupling" denotes a torque converter that employs a working fluid to transmit torque from a drive element to a load element. FIG. 3 illustrates a fluid coupling 18a that is suitable for use as torque converter 18 in the system of FIGS. 1 and 2. Fluid coupling 18a includes a housing 36, a drive element 38, a load element 40, an impeller 42, a turbine wheel 44, a fluid reservoir 46, and guide vanes 48. Drive element 38 extends through an input opening in housing 36, while load element 40 extends through an output opening in housing 36. Impeller 42, turbine wheel 44, and fluid reservoir 46 are all disposed in housing 36. Impeller 42 is rigidly coupled to one end of drive element 38, while turbine wheel 44 is rigidly coupled to one end of load element 40.

Fluid coupling 18a can be adjusted between a disengaged/free-wheel configuration and an engaged/torque-transmitting configuration. When operating in the torque-transmitting configuration, a working fluid 50 is present in fluid reservoir 46 of fluid coupling 18a and is used to transmit torque from drive element 38 to load element 40 via impeller 42 and turbine wheel 44. When rotated by drive element 38, impeller 42 operates as a centrifugal pump to cause the circulation of working fluid 50 in reservoir 46. This circulation of working fluid 50 in reservoir 46 drives the rotation of turbine wheel 44, thereby rotating load element 40. Thus, when operating in the torque-transmitting configuration, fluid coupling 18a takes rotational mechanical energy from drive element 38, transforms the rotational mechanical energy into hydraulic energy using impeller 42, and transforms the hydraulic energy into rotational mechanical energy using turbine wheel 44, thereby causing rotation of load element 40. The position of guide vanes 48 can be adjusted to vary the amount of torque transmitted from drive element 38 to load element 40.

In order to operate in the free-wheel configuration, working fluid 50 is substantially evacuated from fluid reservoir 46. When working fluid 50 is removed from fluid reservoir 46, little or no torque is transmitted from drive element 38 to load element 40. Thus, in the free-wheel configuration, drive element 38 and impeller 42 rotate freely within housing 36, without causing rotation of turbine wheel 44 and load element 40.

Referring now to FIGS. 1, 2, 4, and 5, various configurations for shiftable mechanical lock 16 of FIGS. 1 and 2 are known in the art. In one embodiment of the present invention, shiftable lock 16 is a synchro-self-shifting (SSS) clutch.

FIGS. 4 and 5 illustrate a SSS clutch 16a suitable for use as mechanical lock 16 of FIGS. 1 and 2.

Referring to FIG. 4, SSS clutch 16a generally includes an input portion 52, an output portion 54, and a sliding component 56. Input portion 52 includes an input coupling ring 58, an input shaft 60, a proximal stop 62, and a distal stop 64. Output portion 54 includes an output coupling ring 66, an output clutch ring 68, and a pawl 70. Sliding component 56 includes internal helical splines 72, external clutch teeth 74, and external ratchet teeth 76. Input shaft 60 is configured with external helical splines 78 extending between proximal and distal stops 62 and 64. Sliding component 56 is mounted on input shaft 60 between proximal and distal stops 62 and 64, so that internal and external splines 72 and 78 matingly engage one another. When SSS clutch 16a is employed as mechanical lock 16 of FIGS. 1 and 2, input coupling ring 58 of input portion 52 is rigidly coupled to first drive-side element 24, while output coupling ring 66 of output portion 54 is rigidly coupled to first load-side element 26.

FIGS. 4 and 5a show SSS clutch 16a in a disengaged configuration where input shaft 60 and sliding component 56 rotate freely within output clutch ring 68, and no torque is transmitted from input portion 52 to output portion 54. When the rotational speeds of input shaft 60 and sliding component 56 reach that same speed as output clutch ring 68, rachet teeth 76 of sliding component 56 contact the tip of pawl 70 to prevent further rotation of sliding component 56 relative to output clutch ring 68.

FIG. 5b shows SSS clutch 16a in a transition configuration where pawl 70 prevents rotation of sliding component 56 relative to output clutch ring 68, and the difference between the rotational speed of output portion 54 and input portion 52 causes sliding component 56 to move axially along external helical splines 78 of input shaft 60 toward proximal stop 62. When one of rachet teeth 76 is in contact with pawl 70, external clutch teeth 74 of sliding component 56 are perfectly aligned for engagement with internal clutch teeth 80 of output clutch ring 68. As sliding component 56 moves along input shaft 60, pawl 70 passes out of contact with rachet teeth 76, allowing external and internal clutch teeth to come into flank contact and continue the engaging travel. Note that the only load on pawl 70 is that required to shift sliding component 56 along external helical splines 78.

FIG. 5c shows SSS clutch 16a in an engaged configuration where input portion 52 and output portion 54 are mechanically coupled to one another. Driving torque from input portion 52 is only transmitted when sliding component 56 completes its travel by contacting proximal stop 62, with internal and external clutch teeth 80 and 74 completely engaged and pawl 70 unloaded. Similar to when a nut is screwed against the head of a bolt, no external thrust is produced when sliding component 56 reaches proximal stop 62. If the rotational speed of input portion 52 is reduced relative to output portion 54, the torque on helical splines 78 will reverse. This causes sliding component 56 to automatically return to the disengaged configuration shown in FIG. 5a.

FIGS. 6-11 illustrate alternative torque converting systems which all employ a torque converter and a mechanical lock on separate parallel shafts to transmit torque from a rotational driver to rotating industrial equipment. The main difference between the embodiments illustrated in FIGS. 1, 2, and 6-11 is the location of the driver and load on the parallel shafts.

FIGS. 6 and 7 illustrate a torque transmitting system 110 having a rotational driver 112 on a first parallel shaft 120 and rotating industrial equipment 114 on a second parallel shaft 122. A shiftable mechanical lock 116 is located on first parallel shaft 120, while a torque converter 118 is located on second parallel shaft 122. As depicted in FIG. 6, during start-up, rotational energy is transmitted from a first drive-side element 124 of first parallel shaft 120 to a second drive-side element 128 of second parallel shaft 122 via a drive-side gear mechanism 132. Torque converter 118 then transmits torque from second drive-side element 128 to a second load-side element 130, which directly drives rotating industrial equipment 114.

FIG. 6 illustrates drive-side gear mechanism 132 as having a larger first drive gear "A" and a smaller second drive gear "B." This gear ratio causes second drive-side element 128 to rotate faster than first drive-side element 124. FIG. 6 also illustrates a load-side gear mechanism for transmitting rotational energy between a second load-side element 130 to a first load-side element 126. In the embodiment of FIG. 6, load-side gear mechanism 134 includes equally-sized first and second load gears "C" and "D." In such a configuration, the gear ratio of load-side gear mechanism 132 accounts for all the rotational slippage in torque converter 118, so that the rotational speeds of first drive-side and load-side elements 124 and 126 are substantially synchronized at the operating speed of driver 112.

As depicted in FIG. 7, once the rotational speeds of first drive-side and load-side elements 124 and 126 are substantially synchronized, mechanical lock 116 can be engaged and torque converter disengaged so that torque is transmitted from driver 112 to rotating industrial equipment 114 via mechanical lock 116. As depicted in FIG. 7, during normal operation, load-side gear mechanism 134 is employed to transmit rotational energy from first load-side element 126 to second load-side element 130, which is directly coupled to rotating industrial equipment 114. It should be noted that if it is desired to operate driver 112 and rotating industrial equipment 114 at different rotational speeds, the gear ratio of load-side gear mechanism 134 can be adjusted.

FIGS. 8 and 9 illustrate a torque transmitting system 210 having a shiftable mechanical lock 216 located on a first parallel shaft 220 and a torque converter 218 located on a second parallel shaft 222. A drive-side gear mechanism 232 is employed to transmit rotational energy between a first drive-side element 224 of first parallel shaft 220 and a second drive-side element 228 of second parallel shaft 222. A load-side gear mechanism 234 is employed to transmit rotational energy between a first load-side element 226 of first parallel shaft 220 and a second load-side element 230 of second parallel shaft 222.

As depicted in FIG. 8, during start-up, torque converter 218 transmits rotational energy from second drive-side element 228 to a second load-side element 230, which directly drives rotating industrial equipment 214. FIG. 8 illustrates drive-side gear mechanism 232 as having a larger first drive gear "A" and a smaller second drive gear "B," while load-side gear mechanism 234 has a smaller first drive gear "C" and a larger second drive gear "D." The gear ratios of drive-side and load-side gear mechanisms 232 and 234 cause first drive-element 224 to rotate slower than second drive-side element 228, and first load-side element 226 to rotate faster than second load-side element 230. In such a configuration, the gear ratios of drive-side and load-side gear mechanisms 232 and 234 cooperatively account for the rotational slippage in torque converter 218, so that the rotational speeds of first drive-side and load-side elements 224 and 226 are substantially synchronized at the operating speed of driver 212.

As depicted in FIG. 9, once the rotational speeds of first drive-side and load-side elements 224 and 226 are substantially synchronized, mechanical lock 116 can be engaged and torque converter disengaged so that torque is transmitted from driver 212 to rotating industrial equipment 214 via mechanical lock 216. It should be noted that if it is desired to operate driver 212 and rotating industrial equipment 214 at different rotational speeds, the gear ratios of drive-side gear mechanism 232 and/or load-side gear mechanism 234 can be adjusted.

FIGS. 10 and 11 illustrate a torque transmitting system 310 having rotating industrial equipment 314 on a first parallel shaft 320 and a rotational driver 312 on a second parallel shaft 322. A shiftable mechanical lock 316 is located on first parallel shaft 320, while a torque converter 318 is located on second parallel shaft 322.

As depicted in FIG. 10, during start-up, rotational energy is transmitted from a second drive-side element 328 of second parallel shaft 322 to a second load-side element 330 of second parallel shaft 322 via torque converter 318. A load-side gear mechanism 334 is then employed to transmit rotational energy from second load-side element 330 to a first load side element of first parallel shaft 320, which directly drives rotating industrial equipment 314.

FIG. 10 illustrates load-side gear mechanism 334 as having a smaller first drive gear "C" and a larger second drive gear "D." This gear ratio causes first load-side element 326 to rotate faster than second load-side element 330. FIG. 10 also illustrates a drive-side gear mechanism 332 for transmitting rotational energy between first drive-side element 324 and second drive-side element 328. In the embodiment of FIG. 10, drive-side gear mechanism 332 includes equally-sized first and second drive gears "A" and "B." In such a configuration, the gear ratio of load-side gear mechanism 334 accounts for all the rotational slippage in torque converter 318, so that the rotational speeds of first drive-side and load-side elements 324 and 326 are substantially synchronized at the operating speed of driver 312.

As depicted in FIG. 11, once the rotational speeds of first drive-side and load-side elements 324 and 326 are substantially synchronized, mechanical lock 316 can be engaged and torque converter 318 disengaged so that torque is transmitted from driver 312 to rotating industrial equipment 314 via mechanical lock 316. It should be noted that if it is desired to operate driver 312 and rotating industrial equipment 314 at different rotational speeds, the gear ratio of drive-side gear mechanism 322 can be adjusted.

The systems illustrated in FIGS. 1-11 are capable of being started up and operated with a single driver. The system illustrated in FIG. 12 employs a supplemental driver 420 to assist the main driver 412 in powering the rotating industrial equipment 414 during start-up and/or during normal operation. Main driver 412 is preferably a gas turbine. Supplemental driver 420 is preferably an electric motor. Most preferably, supplemental driver 420 is an electrical motor that is not equipped with a variable frequency drive. As illustrated in FIG. 12, a torque transmitting system 410 is employed to transmit torque from an output shaft 422 of supplemental driver 420 to and input shaft 424 of rotating industrial equipment 414, while main driver 412 is directly coupled to rotating industrial equipment 414 via drive shaft 426.

Referring again to FIG. 12, torque transmitting system 410 preferably has a configuration similar to the torque transmitting systems illustrated in greater detail in FIGS. 1-11. That is, torque transmitting system 410 of FIG. 12 preferably includes a torque converter and a mechanical lock, with the torque convert and mechanical lock being disposed on different parallel shafts operably connected to one another by one or more gear mechanisms. The embodiment illustrated in FIG. 12 can be started up and operated in the manner described immediately below.

The embodiment illustrated in FIG. 12 can be operated in four different modes to help transition main driver 412, supplemental driver 420, and rotating industrial equipment 414 from static conditions to full operating conditions. The four modes of operation can be identified as follows: (1) a "supplemental driver-only mode;" (2) a "torque transition mode;" (3) a "synchronized mode;" and (4) a "mechanically-locked mode."

In the "supplemental driver-only mode," the rotational speed of supplemental driver 420 is increased from at or near zero rpm to full operating speed, while the rotational speeds of main driver 412 and rotating industrial equipment 414 are maintained at or near zero. During the supplemental driver-only mode, the torque converter and mechanical lock of torque transmitting system 410 are disengaged so that supplemental driver output shaft 422 rotates, while load input shaft 424 remains static. In order to shift from the supplemental driver-only mode to the torque transition mode, the torque converter of torque transmitting system 410 is shifted from the disengaged configuration to the engaged configuration.

In the "torque transition mode," the rotational speed of supplemental driver 420 and shaft 422 are maintained at approximately full operating speed and the torque converter of torque transmitting system 410 is employed to transmit torque from supplemental driver output shaft 422 to load input shaft 424, thereby increasing the rotational speed of rotating industrial equipment 414 and main driver 412. During at least a portion of the torque transition mode, main driver 412 is employed to assist supplemental driver 420 in rotating industrial equipment 414. During the torque transition mode, the rotational speed of main driver 412 and rotating industrial equipment 414 are increased from at or near zero rpm to a their full operating speeds. When the rotational speed of load input shaft 424 is at full operating speed, the mechanical lock of torque transmitting system 410 can be shifted from the disengaged configuration to the engaged configuration.

During the "synchronized mode," both the mechanical lock and the torque converter of torque transmitting system 410 are in the engaged configuration. Preferably, the system illustrated in FIG. 12 operates in the synchronized mode for a very short period of time because once the mechanical lock has been engaged, there is no further need to use the torque converter to transmit torque. Thus, soon after the mechanical lock is shifted into the engaged configuration, the torque converter is adjusted back into the disengaged configuration, thereby transitioning the system into the mechanically-locked mode.

In the "mechanically-locked mode," the mechanical lock of torque transmitting system 410 is in the engaged configuration, while the torque converter is in the disengaged configuration so that all of the torque transmitted from supplemental driver 420 to rotating industrial equipment 414 is transmitted via the mechanical lock. In the mechanically-locked mode, main driver 412 and supplemental driver 420 cooperatively drive rotating industrial equipment 414.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of starting up rotating industrial equipment, said method comprising:
  (a) using a torque converter to transmit torque from a rotational driver to said rotating industrial equipment wherein said torque converter being adjustable between a free-wheel mode and a torque-transmitting mode wherein said torque converter operating in torque transmitting mode during step (a);
  (b) using at least one gear mechanism to substantially synchronize the speeds of a first drive-side element and a first load-side element, said first drive-side and load-side elements having a shiftable mechanical lock coupled there between;
  (c) using said shiftable mechanical lock to transmit torque from said driver to said rotating industrial equipment wherein said torque converter operating in said free-wheel mode during at least a portion of step (c); and
  (d) when the rotational speeds of said first drive-side and load-side elements are substantially synchronized, shifting said mechanical lock from a disengaged configuration to an engaged configuration to thereby mechanically lock said first drive-side and load-side elements to one another.

2. The method of claim 1,
steps (a) and (b) being carried out simultaneously.

3. The method of claim 2,
step (a) including increasing the rotational speed of said first load-side element relative to said first drive-side element.

4. The method of claim 3,
step (b) being accomplished without using additional external drivers to increase the rotational speed of said first load-side element.

5. The method of claim 1,
step (b) including causing said first load-side element to rotate at a speed within about 5 percent of the rotational speed of said first drive-side element.

6. The method of claim 1,
step (b) including causing said first load-side element to rotate at a speed within about 1 percent of the rotational speed of said first drive-side element.

7. The method of claim 1; and
(e) subsequent to step (d), adjusting an operating parameter of said rotating industrial equipment so that the amount of power required to drive said rotating industrial equipment is increased by at least about 5 percent.

8. The method of claim 1,
said mechanical lock being in said disengaged configuration during at least a portion of step (a),
said mechanical lock being in said engaged configuration during step (c).

9. The method of claim 1,
said torque converter transmitting substantially no torque during said free-wheel mode,
said torque converter transmitting torque during said torque-transmitting mode.

10. The method of claim 1; and
(f) subsequent to step (d), adjusting said torque converter from said torque-transmitting mode to said free-wheel mode.

11. The method of claim 10; and
(g) prior to step (a), increasing the rotational speed of said driver without rotating said rotating industrial equipment,
said torque converter operating in said free-wheel mode during at least a portion of step (g).

12. The method of claim 11; and
(h) subsequent to step (g) and prior to step (a), adjusting said torque converter from said free-wheel mode to said torque-transmitting mode.

* * * * *